US012395062B2

(12) United States Patent
Won et al.

(10) Patent No.: US 12,395,062 B2
(45) Date of Patent: Aug. 19, 2025

(54) DEVICE FOR CONTROLLING SPACE VECTOR PULSE WIDTH MODULATION USING 3-PHASE 4-LEG INVERTER UNDER SINGLE LINE-TO-GROUND FAULTS IN ISLANDED MICROGRIDS AND METHOD THEREOF

(71) Applicant: RESEARCH & BUSINESS FOUNDATION SUNGKYUNKWAN UNIVERSITY, Suwon-si (KR)

(72) Inventors: Chung Yuen Won, Gwacheon-si (KR); Chang Gyun An, Suwon-si (KR); Hoon Lee, Suwon-si (KR); Tae Gyu Kim, Suwon-si (KR)

(73) Assignee: RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 299 days.

(21) Appl. No.: 18/202,003

(22) Filed: May 25, 2023

(65) Prior Publication Data

US 2023/0412064 A1    Dec. 21, 2023

(30) Foreign Application Priority Data

Jun. 21, 2022    (KR) .................. 10-2022-0075308

(51) Int. Cl.
*H02M 1/00*    (2007.01)
*H02H 3/16*    (2006.01)
(Continued)

(52) U.S. Cl.
CPC ........... *H02M 1/088* (2013.01); *H02M 7/537* (2013.01)

(58) Field of Classification Search
CPC ... H02M 7/537; H02M 7/53876; H02H 3/165
See application file for complete search history.

(56) References Cited

U.S. PATENT DOCUMENTS

| 2019/0229643 A1* | 7/2019 | Bax ......................... H02M 1/12 |
| 2022/0045599 A1* | 2/2022 | Won .................. H02M 7/53876 |
| 2023/0387789 A1* | 11/2023 | Arafat ............... H02M 7/53871 |

FOREIGN PATENT DOCUMENTS

| CN | 108809136 A | * | 11/2018 | |
| CN | 110086370 A | * | 8/2019 | .............. H02M 1/32 |

(Continued)

OTHER PUBLICATIONS

Senyu Du "A Simplified Space Vector Modulation in abc Coordinate for Four-Leg Current Source Inverters" (Year: 2024).*

(Continued)

*Primary Examiner* — Sisay G Tiku

(57) ABSTRACT

The present invention relates to a control method which can perform, although a line-to-ground fault occurs in phase 1, coordinate transformation to separate the line-to-ground fault of phase 1 without unnecessary power outage by utilizing remaining normal phases, and apply transformed space vector pulse width modulation (SVPWM) to the converted coordinates, and the present invention has been made in view of the above problems, and it is an object of the present invention to provide a method of controlling space vector pulse width modulation (SVPWM), which applies zero voltage to ground-faulted phase 1 and makes an inverter operate normally with only the remaining sound phases in order to prevent unnecessary loss generated as even other sound phases are blocked when a single line-to-ground fault occurs. According to the device, method, and computer program of the present invention for controlling space vector pulse width modulation using a 3-phase 4-leg inverter under a single line-to-ground fault in an islanded microgrid, since available voltage switching vectors are limited as phase 1, in which a line-to-ground fault has occurred, and phase n are restricted to have the same switching state, a novel coordinate transformation may be (Continued)

performed to compensate for the distortions generated therefrom, and since a novel space vector pulse width modulation (SVPWM) method that can be appropriately applied to the transformed coordinates can be provided, the problem of inducing loss of power and reducing the life of devices by unnecessarily cutting off even the sound phases can be solved even when a line-to-ground fault occurs.

17 Claims, 22 Drawing Sheets

(51) Int. Cl.
    *H02M 1/088*     (2006.01)
    *H02M 7/537*     (2006.01)
    *H02M 7/538*     (2007.01)

(56) References Cited

FOREIGN PATENT DOCUMENTS

| | | |
|---|---|---|
| JP | 2001-218360 A | 8/2001 |
| KR | 10-0473798 B1 | 3/2005 |
| KR | 10-2022-0017567 A | 2/2022 |
| KR | 10-2525603 B1 | 4/2023 |

OTHER PUBLICATIONS

Chang-Gyun "Load Unbalanced Compensation Method with Artificial Neural Network for Grid-Connected Four-Leg Inverter." (Year: 2021).*

TK.Oranpiroj "The 3-Phase 4-Wire Voltage Sag Generator Based on Three Dimensions Space Vector Modulation in abc Coordinates" (Year: 2009).*

Changjiang Zhan "Four-Wire Dynamic Voltage Restorer Based on a Three-Dimensional Voltage Space Vector PWM Algorithm" (Year: 2003).*

Abdelkader Bouarfa "A new control allocation method for power converter and its application to the fourth leg tow level inverter". (Year: 2015).*

Tomas Glasberger "Comparison of 3D-SVPWM and Carrier-Based PWM of Three-Phase Four-Leg Voltage Source Inverter" Published 2007 (Year: 2007).*

An, Chang-Gyun, et al. "A New PLL method using O-axis-Transform in One Phase Load Short Circuit of 3-Phase 4-Wire Interlinking Converter" Proceedings of the Korean Society of Lighting and Electrical Equipment Conference, 2019, (1 page in Korean, Abstract in English).

An, Chang-Gyun, et al. "A New 3D SVM Method under Single-Line-to-Ground Fault in Three Phase Four Wire Interlinking Converter." Proceedings of the KIPE Conference. The Korean Institute of Power Electronics, 2019, (2 pages in Korean, Abstract in English).

An, Chang-Gyun, et al. "Space vector pulse-width modulation control strategy for four-leg inverters under single line-to-ground faults in islanded microgrids." IEEE Access 10 (2022): 18557-18569, (13 pages in English).

* cited by examiner

FIG. 3A

TABLE I
NORMALIZED FIVE-LEG VSI OUTPUTS VOLTAGES

| | $S_1S_2S_3S_4$ | $V_{an}$ | $V_{bn}$ | $V_{cn}$ | $V_\alpha$ | $V_\beta$ | $V_z$ |
|---|---|---|---|---|---|---|---|
| $\vec{V}_1$ | 0000 | 0 | 0 | 0 | 0 | 0 | 0 |
| $\vec{V}_2$ | 0010 | 0 | 0 | 1 | $-\sqrt{\frac{1}{6}}$ | $-\sqrt{\frac{1}{2}}$ | $\frac{1}{\sqrt{3}}$ |
| $\vec{V}_3$ | 0100 | 0 | 1 | 0 | $-\sqrt{\frac{1}{6}}$ | $\sqrt{\frac{1}{2}}$ | $\frac{1}{\sqrt{3}}$ |
| $\vec{V}_4$ | 0110 | 0 | 1 | 1 | $-\sqrt{\frac{2}{3}}$ | 0 | $\frac{2}{\sqrt{3}}$ |
| $\vec{V}_5$ | 1000 | 1 | 0 | 0 | $\sqrt{\frac{2}{3}}$ | 0 | $\frac{1}{\sqrt{3}}$ |
| $\vec{V}_6$ | 1010 | 1 | 0 | 1 | $\sqrt{\frac{1}{6}}$ | $-\sqrt{\frac{1}{2}}$ | $\frac{2}{\sqrt{3}}$ |
| $\vec{V}_7$ | 1100 | 1 | 1 | 0 | $\sqrt{\frac{1}{6}}$ | $\sqrt{\frac{1}{2}}$ | $\frac{2}{\sqrt{3}}$ |
| $\vec{V}_8$ | 1110 | 1 | 1 | 1 | 0 | 0 | $\sqrt{3}$ |
| $\vec{V}_9$ | 0001 | −1 | −1 | −1 | 0 | 0 | $-\sqrt{3}$ |
| $\vec{V}_{10}$ | 0011 | −1 | −1 | 0 | $-\sqrt{\frac{1}{6}}$ | $-\sqrt{\frac{1}{2}}$ | $-\frac{2}{\sqrt{3}}$ |
| $\vec{V}_{11}$ | 0101 | −1 | 0 | −1 | $-\sqrt{\frac{1}{6}}$ | $\sqrt{\frac{1}{2}}$ | $-\frac{2}{\sqrt{3}}$ |
| $\vec{V}_{12}$ | 0111 | −1 | 0 | 0 | $-\sqrt{\frac{2}{3}}$ | 0 | $-\frac{1}{\sqrt{3}}$ |
| $\vec{V}_{13}$ | 1001 | 0 | −1 | −1 | $\sqrt{\frac{2}{3}}$ | 0 | $-\frac{2}{\sqrt{3}}$ |
| $\vec{V}_{14}$ | 1011 | 0 | −1 | 0 | $\sqrt{\frac{1}{6}}$ | $-\sqrt{\frac{1}{2}}$ | $-\frac{1}{\sqrt{3}}$ |
| $\vec{V}_{15}$ | 1101 | 0 | 0 | −1 | $\sqrt{\frac{1}{6}}$ | $\sqrt{\frac{1}{2}}$ | $-\frac{1}{\sqrt{3}}$ |
| $\vec{V}_{16}$ | 1111 | 0 | 0 | 0 | 0 | 0 | 0 |

FIG. 10

TABLE II
ROTATION ANGLE CONVERSION FOR EACH SECTOR

| SECTOR | $\delta$ | $n$ |
|---|---|---|
| I | $\theta$ | 0 |
| II | $\theta - \pi/4$ | 1/4 |
| III | $\theta - \pi/2$ | 1/2 |
| IV | $\theta - \pi$ | 1 |
| V | $\theta - 5\pi/4$ | 5/4 |
| VI | $\theta - 6\pi/4$ | 6/4 |

DEVICE FOR CONTROLLING SPACE VECTOR PULSE WIDTH MODULATION USING 3-PHASE 4-LEG INVERTER UNDER SINGLE LINE-TO-GROUND FAULTS IN ISLANDED MICROGRIDS AND METHOD THEREOF

CROSS-REFERENCE TO RELATED APPLICATIONS

This application claims the priority benefit of Korean Patent Application No. 10-2022-0075308 filed on Jun. 21, 2022 in the Korean Intellectual Property Office, the disclosures of which are incorporated herein by reference.

BACKGROUND

1. Field

The present invention relates to a device for controlling space vector pulse width modulation using a 3-phase 4-leg inverter under a single line-to-ground fault in an islanded microgrid, and a method thereof, and more specifically, to a control method which can perform, although a line-to-ground fault occurs in phase 1, coordinate transformation to separate the line-to-ground fault of phase 1 without unnecessary power outage by utilizing remaining normal phases, and apply transformed space vector pulse width modulation (SVPWM) to the converted coordinates.

2. Description of the Related Art

Conventionally, when a single line-to-ground fault occurs in an islanded microgrid, there is a problem in that unnecessary loss of power outage occurs as all power facilities, as well as the grounded phase 1, are cut off, and the life of breaking devices such as circuit breakers and switches is shortened as an electro-chemical corrosion phenomenon is induced.

SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

Therefore, the present invention has been made in view of the above problems, and it is an object of the present invention to provide a method of controlling space vector pulse width modulation (SVPWM), which applies zero voltage to ground-faulted phase 1 and makes an inverter operate normally with only the remaining sound phases in order to prevent unnecessary loss generated as even other sound phases are blocked when a single line-to-ground fault occurs.

As a means for solving the problems described above, there is provided a device for controlling space vector pulse width modulation using a 3-phase 4-leg inverter under a single line-to-ground fault in an islanded microgrid, the device comprising: a memory configured to store instructions; and a processor for selecting a combination of voltage switching vectors on the basis of voltage switching vectors of the 3-phase 4-leg inverter, transforming distortion factors into stationary components through a rotation transformation matrix and a phase adjustment matrix for compensating for distortions generated by the line-to-ground fault, and controlling space vector pulse width modulation switching for the transformed coordinates.

As another means for solving the problems described above, according to an embodiment of the present invention, there is provided a method of controlling space vector pulse width modulation using a 3-phase 4-leg inverter under a single line-to-ground fault in an islanded microgrid, performed by a processor executing instructions stored in a memory, the method comprising the steps of: selecting a combination of voltage switching vectors on the basis of voltage switching vectors of the 3-phase 4-leg inverter, transforming distortion factors into stationary components through a rotation transformation matrix and a phase adjustment matrix for compensating for distortions generated by the line-to-ground fault, and controlling space vector pulse width modulation switching for the transformed coordinates.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 3A is a view for explaining a table showing 16 voltage switching vectors of a 3-phase 4-leg inverter when a line-to-ground fault does not occur.

FIG. 10 is a view for explaining a generalized process of calculating duty ratios according to the present invention.

Throughout the drawings and the detailed description, the same reference numerals may refer to the same, or like, elements. The drawings may not be to scale, and the relative size, proportions, and depiction of elements in the drawings may be exaggerated for clarity, illustration, and convenience.

DETAILED DESCRIPTION

Hereinafter, embodiments of the present invention will be described in detail with reference to the drawings. The following description is only for specifying the embodiments, and is not intended to limit or restrict the scope of right according to the present invention. Those that can be easily inferred by those skilled in the art from the detailed description and embodiments of the present invention should be construed as belonging to the scope of the present invention.

Although the terms used in the present invention are described as general terms widely used in the technical field related to the present invention, the meaning of the terms used in the present invention may vary according to the intention of a technician working in a corresponding field, emergence of new technologies, screening standards, precedents, or the like. Some of the terms may be randomly selected by the applicant, and in this case, the meaning of the randomly selected terms will be described in detail. The terms used in the present invention should be interpreted as a meaning that reflects the overall context of the specification, not just dictionary meanings.

Terms such as 'configuring' or 'comprising' used in the present invention should not be construed as necessarily including all of the components or steps described in the specification, and the cases where some components or steps are not included and the cases where additional components or steps are further included should also be construed as being intended from the terms.

Although the terms including ordinal numbers such as 'first' or 'second' used in the present invention may be used to describe various components or steps, the components or steps should not be limited by the ordinal numbers. The terms including ordinal numbers should only be construed to distinguish one component or step from other components or steps.

Hereinafter, embodiments of the present invention will be described in detail with reference to the drawings. For the matters widely known to those skilled in the art, detailed description thereof will be omitted.

Hereinafter, a situation in which a single line-to-ground fault occurs in a 3-phase 4-leg inverter in an islanded microgrid according to the present invention will be described with reference to the accompanying drawings.

Figure 1:
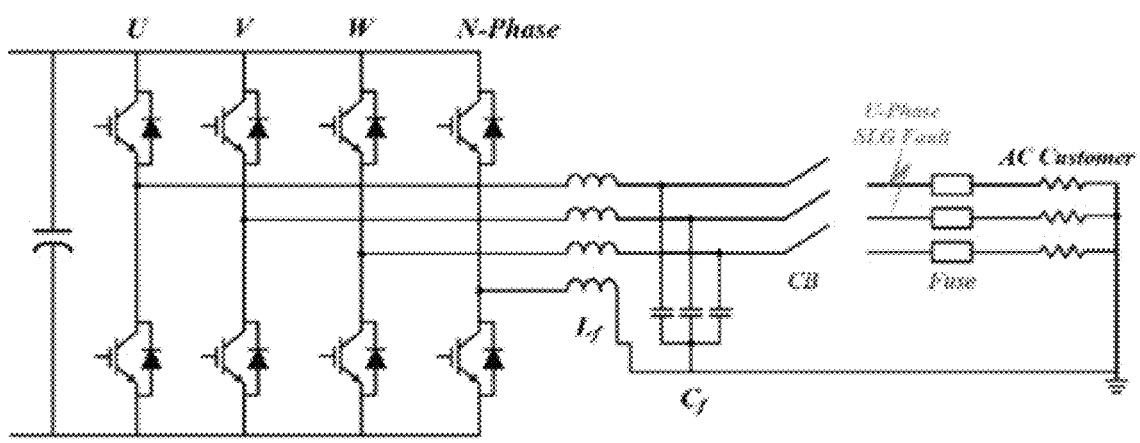
FIG. 1 is a view for explaining a situation in which a single line-to-ground fault occurs in a 3-phase 4-leg inverter in an islanded microgrid according to the present invention.

FIG. 1 is a view for explaining a situation in which a single line-to-ground fault occurs in a 3-phase 4-leg inverter in an islanded microgrid according to the present invention.

Referring to FIG. 1, a 3-phase 4-leg inverter 100 utilized in an islanded microgrid may be shown. The islanded microgrid may mean a small-scale power grid utilized to connect renewable energy sources that replace conventional power grid systems to a power distribution network.

The 3-phase 4-leg inverter 100 may receive DC voltage and output 3-phase AC voltage through switching of four phases (U, V, W, N). Switching of four phases (U, V, W, N) may be performed by a control means such as a microcontroller, processor, or the like. The present invention may provide a novel space vector pulse width modulation (SVPWM) control technique when a single line-to-ground fault occurs in any one of the three phases (e.g., U phase) of the three-phase four-leg inverter 100.

Hereinafter, the configuration of the space vector pulse width modulation control device according to the present invention will be described with reference to the drawings.

Figure 2:
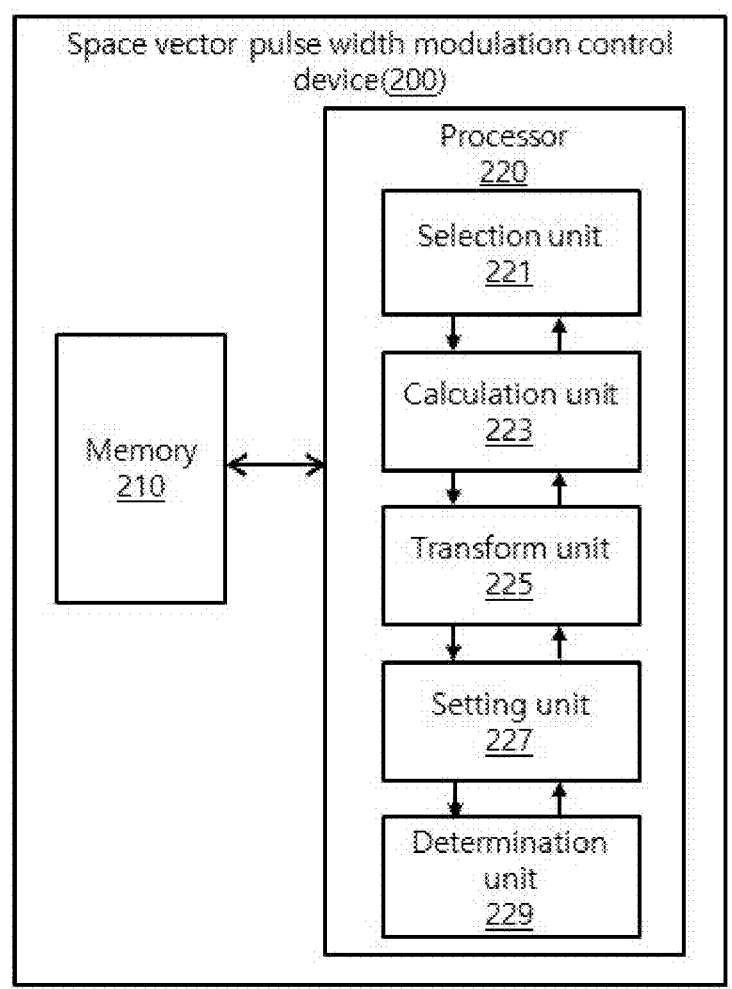
FIG. 2 is a view for explaining the configuration of a device for controlling space vector pulse width modulation according to the present invention.

FIG. 2 is a view for explaining the configuration of a device for controlling space vector pulse width modulation according to the present invention.

Referring to FIG. 2, the space vector pulse width modulation control device 200 may include a memory 210 and a processor 220. However, it is not limited thereto, and other general-purpose components may be further included in the space vector pulse width modulation control device 200.

The space vector pulse width modulation control device 200 may be an electronic device for controlling switching of the 3-phase 4-leg inverter 100. For example, the space vector pulse width modulation control device 200 may be a computing device for executing a computer program or mobile application that implements space vector pulse width modulation switching control.

The memory 210 may have a structure for storing various instructions or data processed by the space vector pulse width modulation control device 200. For example, the memory 210 may be implemented as a non-volatile memory such as ROM, PROM, EPROM, EEPROM, flash memory, PRAM, MRAM, RRAM, FRAM, or the like, or a volatile memory such as DRAM, SRAM, SDRAM, PRAM, RRAM, or FeRAM. It may be implemented in the form of HDD, SSD, SD, Micro-SD, or the like, or a combination thereof.

The processor 220 may have a structure for performing processes required for the operation of the space vector pulse width modulation control device 200. The processor 220 may be implemented as an array of multiple logic gates or a general-purpose microprocessor for processing various operations inside the space vector pulse width modulation control device 200, and may be configured of a single processor or a plurality of processors. For example, the processor 220 may be implemented in the form of at least one among a microprocessor, CPU, GPU, and AP.

The processor 220 may operate by executing the instructions stored in the memory 210.

The processor 220 may include a selection unit 221, a calculation unit 223, a transform unit 225, a setting unit 227, and a determination unit 229.

The selection unit 221 may select a combination of voltage switching vectors on the basis of the voltage switching vectors of the 3-phase 4-leg inverter 100.

More specifically, the selection unit 221 may select a combination of voltage switching vectors on the basis of the switch state of each phase, in which a single line-to-ground fault has occurred, among the voltage switching vectors of the 3-phase 4-leg inverter 100.

The selection unit 221 may be configured to select a combination of voltage switching vectors that make the switching state of phase 1 (U), in which a line-to-ground fault has occurred, the same as the switching state of phase n.

Although the present invention describes a case where a single line-to-ground fault occurs in phase U, the description of the present invention may be equally applied to a case where a single line-to-ground fault occurs in the phases other than U, for example, phase W or phase V. For example, since switching states of phase 1 (U) and phase n are equally set, a combination may be formed by selecting only 8 voltage switching vectors among 16 voltage switching vectors of the 3-phase 4-leg inverter 100.

The calculation unit 223 may be configured to calculate a normal vector NU on the basis of the combination of voltage switching vectors, and calculate a rotation transformation matrix RU for compensating for distortions generated due to a line-to-ground fault on the basis of the normal vector.

The calculation unit 223 may calculate a normal vector by performing a cross product on a plurality of voltage switching vectors selected from the combination of voltage switching vectors.

At this point, the normal vector NU may be a vector orthogonal to a plane in a three-dimensional voltage vector space formed by a combination of voltage switching vectors.

The calculation unit 223 may calculate a matrix configured of any one voltage switching vector among a plurality of voltage switching vectors, a cross product of a voltage switching vector and a normal vector, and a normal vector as a rotation transformation matrix.

Although 16 voltage switching vectors may be formed symmetrically in a three-dimensional voltage vector space when a single line-to-ground fault does not occur, when the switching states of phase 1 (U) and phase n are set equally and it is restricted to allow only 8 voltage switching vectors, 8 voltage switching vectors may form a plane in the three-dimensional voltage vector space.

Here, a normal vector NU orthogonal to a corresponding plane and a rotation transformation matrix RU may be calculated through a vector cross product operation.

In addition, the calculation unit 223 may calculate duty ratios d1, d2, and d0 on the basis of a reference sector.

The calculation unit 223 may calculate duty ratios d1, d2, and d0 for expressing the reference vector as effective switching vectors corresponding to the reference sector.

Since two effective switching vectors may correspond to the reference sector in which the reference vector $\vec{V}_{ref}$ is located, the reference vector $\vec{V}_{ref}$ may be expressed as a linear combination of the two effective switching vectors. To this end, when two duty ratios d1 and d2 are calculated for two effective switching vectors, the remaining duty ratio d0 may be determined accordingly.

The transform unit 225 may transform distortion factors into stationary components to be projected onto a two-dimensional SVPWM plane in a three-dimensional voltage vector space.

More specifically, the transform unit 225 may be configured to transform distortion factors into stationary components by performing coordinate transformation through the rotation transformation matrix RU and phase difference adjustment through a phase adjustment matrix Padj.

The transform unit 225 may be configured to transform distortion factors generated due to a line-to-ground fault into stationary components by applying a rotation transformation matrix RU and a phase adjustment matrix Padj to a result of three-phase alpha-beta transformation TClarke.

The three-phase alpha-beta transformation TClarke may mean alpha-beta projection transformation commonly used in the 3-phase 4-leg inverter 100. However, when the number of available voltage switching vectors is limited due to a single line-to-ground fault, distortion factors may be generated due to the limitation, and thus a rotation transformation matrix RU and a phase adjustment matrix Padj may be applied to the result of the three-phase alpha-beta transformation TClarke to compensate for this. The phase adjustment matrix Padj may adjust the phase difference between two sound phases in which no line-to-ground fault has occurred.

The setting unit 227 may set a reference sector in which the reference vector $\vec{V}_{ref}$ is located, among the sectors generated by dividing the voltage vector area on the two-dimensional SVPWM plane related to the stationary components.

More specifically, when coordinate transformation is performed at the previous steps in response to a situation of a single line-to-ground fault, a new space vector pulse width modulation SVPWM may be performed thereafter on the transformed coordinates. To this end, a two-dimensional SVPWM plane voltage vector area related to the stationary components may be projected, and then a sector in which the reference vector $\vec{V}_{ref}$ is located is determined, among the sectors generated by dividing the voltage vector area, and the sector may be treated as a reference sector.

The determination unit 229 may be configured to determine an order of applying voltage vectors for the effective switching vectors and zero vectors to be applied, according to the duty ratios d1, d2, and d0.

The determination unit 229 may determine an order of applying voltage vectors by arranging the effective switching vectors and zero vectors to be applied, according to the duty ratios d1, d2, and d0 during the modulation period Δ Tm for the reference sector.

The determination unit 229 may switch the 3-phase 4-leg inverter 100 during a time period according to two duty ratios for two effective switching vectors corresponding to the reference sector in which the reference vector $\vec{V}_{ref}$ is located.

The determination unit 229 may switch the 3-phase 4-leg inverter so that the zero vectors (e.g., $\vec{V}_1$ and $\vec{V}_{16}$ of FIG. 3) may be applied to the 3-phase 4-leg inverter 100 during duty ratio d0, which is the remaining time period excluding two duty ratios d1 and d2 from the modulation period Δ Tm.

At this point, since the harmonic characteristics may vary according to the order of applying switching voltage vectors, a process of appropriately determining the order of applying the switching voltage vectors may be required.

Hereinafter, voltage switching vectors of a 3-phase 4-leg inverter in a case where a line-to-ground fault does not occur according to the present invention will be described with reference to the drawings.

Figure 3B:
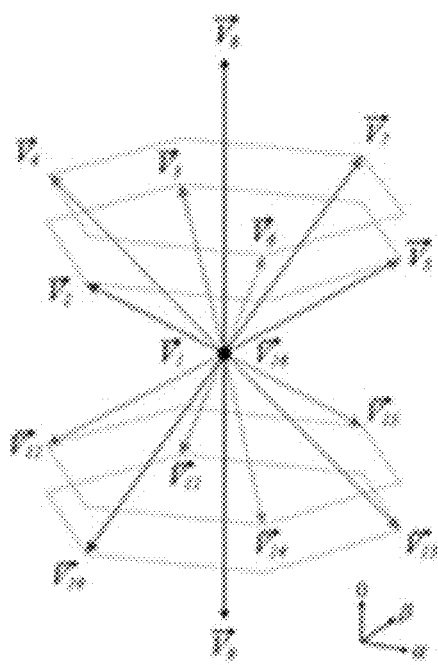
FIG. 3B is a view for explaining a three-dimensional voltage vector space formed by voltage switching vectors.
Figure 3C:
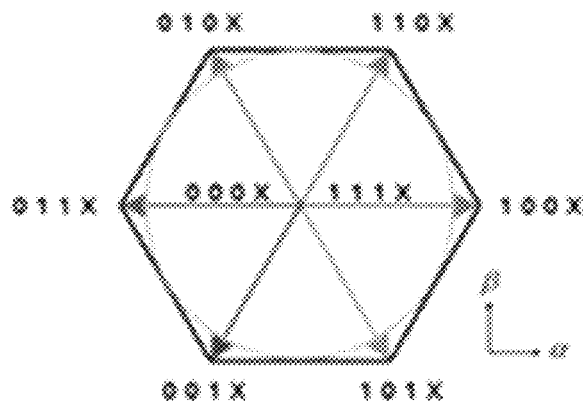
FIG. 3C is a view for explaining a two-dimensional SVPWM plane two-dimensionally projecting a three-dimensional voltage vector space.

FIG. 3*a* is a view for explaining a table showing 16 voltage switching vectors of a 3-phase 4-leg inverter when a line-to-ground fault does not occur, FIG. 3*b* is a view for explaining a three-dimensional voltage vector space formed by voltage switching vectors, and FIG. 3*c* is a view for explaining a two-dimensional SVPWM plane two-dimensionally projecting a three-dimensional voltage vector space.

As shown in FIGS. 3*a* to 3*c*, when a line-to-ground fault does not occur, since all 16 voltage switching vectors for two states of 4 legs can be utilized, 16 voltage switching vectors may be symmetrically distributed as shown in the three-dimensional voltage vector space, and a voltage vector area on the two-dimensional SVPWM plane on which the voltage switching vectors are projected two-dimensionally may also have a regular hexagonal shape, which is not distorted or deformed.

With regard to the 16 voltage switching vectors of FIG. 3a, the selection unit 221 may be configured to select 8 voltage switching vectors ($\vec{V}_1$=0000, $\vec{V}_2$=0010; $\vec{V}_3$=0100, $\vec{V}_4$=0100, $\vec{V}_{13}$=1001, $\vec{V}_{14}$=1011, $\vec{V}_{15}$=1101, $\vec{V}_{16}$=1111), of which the switching state S1 of phase 1 (U) and the switching state S4 of phase n are the same, among the 16 voltage switching vectors ($\vec{V}_1$, . . . , $\vec{V}_{16}$) of the 3-phase 4-leg inverter 100, as a combination, when a combination of voltage switching vectors $\vec{V}_k$=$S_1S_2S_3S_4$ is selected.

It may be restricted in the same manner for phase V or phase W, other than phase U, to utilize only 8 voltage switching vectors that make the switching state of phase V or W the same as the switching state of phase n.

Hereinafter, a space vector pulse width modulation scheme when a single line-to-ground fault occurs and when a single line-to-ground fault does not occur according to the present invention will be described with reference to the drawings.

Figure 4:
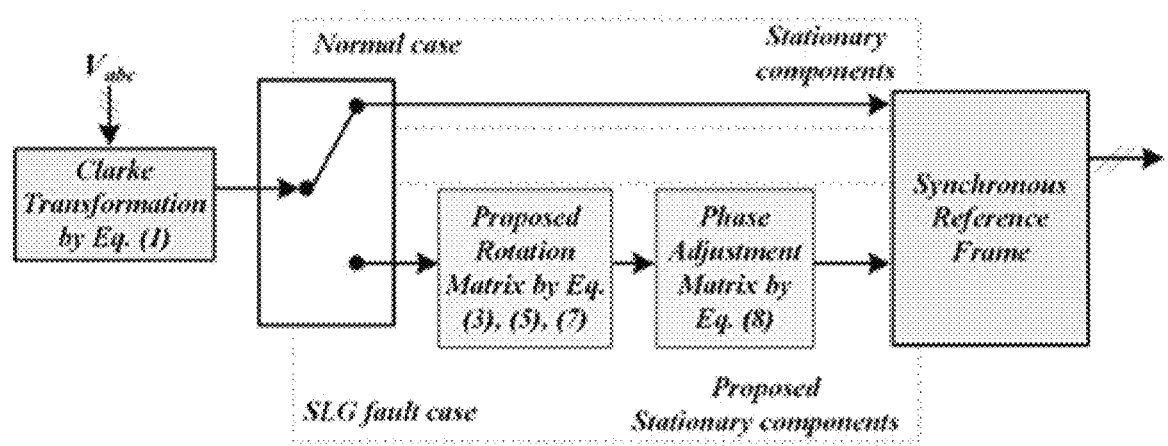
FIG. 4 is a view for explaining a space vector pulse width modulation scheme when a single line-to-ground fault occurs and when a single line-to-ground fault does not occur according to the present invention.

FIG. 4 is a view for explaining a space vector pulse width modulation scheme when a single line-to-ground fault occurs and when a single line-to-ground fault does not occur according to the present invention.

Referring to FIG. 4, a space vector pulse width modulation scheme when a single line-to-ground fault occurs and when a single line-to-ground fault does not occur may be shown.

In the space vector pulse width modulation scheme, when a single line-to-ground fault does not occur, stationary components are generated through three-phase alpha-beta transformation TClarke, and synchronous reference frame transformation may be performed on the stationary components like in the normal case as described above. However, when a single line-to-ground fault occurs, coordinate transformation through a rotation transformation matrix RU and phase difference adjustment through a phase adjustment matrix Padj may be performed in order to generate stationary components like in the lower SLG case.

The Clarke transformation or the three-phase alpha-beta transformation TClarke assuming three-phase balanced voltage may be expressed as shown in the following equation for the variables Xa, Xb, Xc of the coordinate system before the transformation and the variables $X_\alpha$, $X_\beta$, $X_\gamma$ of the coordinate system after the transformation.

$$\begin{bmatrix} X_\alpha \\ X_\beta \\ X_\gamma \end{bmatrix} = \frac{2}{3} \begin{bmatrix} 1 & -1/2 & -/2 \\ 0 & \sqrt{3}/2 & -\sqrt{3}/2 \\ 1/\sqrt{2} & 1/\sqrt{2} & 1/\sqrt{2} \end{bmatrix} \cdot \begin{bmatrix} X_a \\ X_b \\ X_c \end{bmatrix} \quad \text{[Equation 1]}$$

Hereinafter, a method of limiting available voltage switching vectors when a single line-to-ground fault occurs in each phase according to the present invention will be described with reference to the drawings.

Figure 5A:
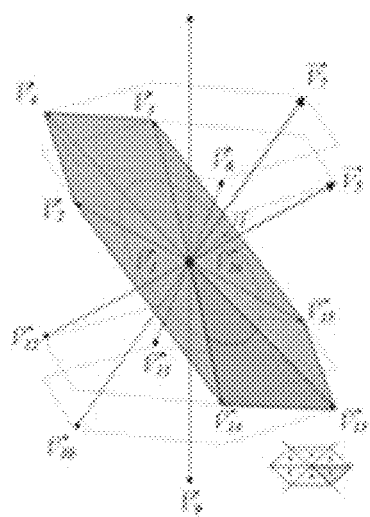
FIG. 5A is a view for explaining a graph showing a combination of voltage switching vectors in case of a U-phase line-to-ground fault.
Figure 5B:
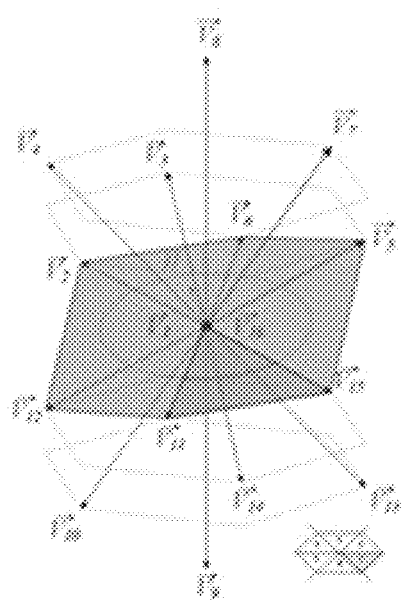
FIG. 5B is a view for explaining a graph showing a combination of voltage switching vectors in case of a V-phase line-to-ground fault.
Figure 5C:
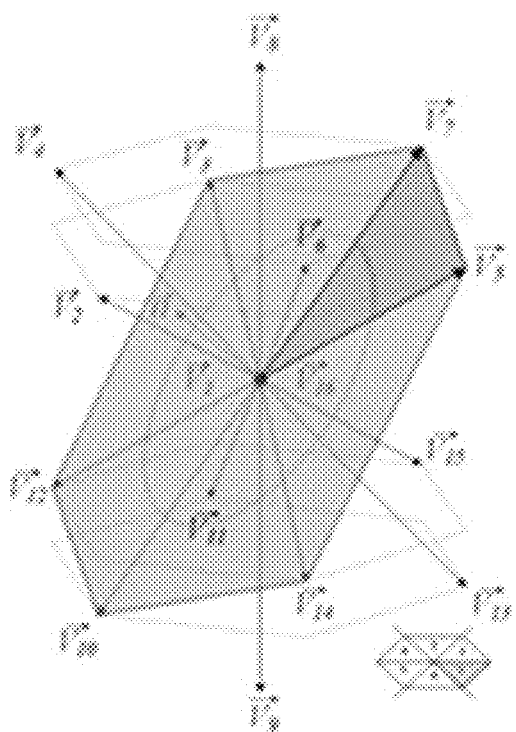
FIG. 5C is a view for explaining a graph showing a combination of voltage switching vectors in case of a W-phase line-to-ground fault.

FIG. 5a is a view for explaining a graph showing a combination of voltage switching vectors in case of a U-phase line-to-ground fault, FIG. 5b is a view for explaining a graph showing a combination of voltage switching vectors in case of a V-phase line-to-ground fault, and FIG. 5c is a view for explaining a graph showing a combination of voltage switching vectors in case of a W-phase line-to-ground fault.

As shown in FIGS. 5a to 5c, with regard to the method of limiting available voltage switching vectors when a single line-to-ground fault occurs in each phase, a graph showing a combination of voltage switching vectors when a U-phase line-to-ground fault occurs, a graph showing a combination of voltage switching vectors when a V-phase line-to-ground fault occurs, and a graph showing a combination of voltage switching vectors when a W-phase line-to-ground fault occurs can be expressed in the three-dimensional voltage vector space.

For example, the calculation unit 223 may be configured to calculate, when a rotation transformation matrix RU is calculated with regard to the graph showing a combination of voltage switching vectors when a U-phase line-to-ground fault occurs, a normal vector NU by performing a cross product on two voltage switching vectors $\vec{V}_{13}$, $\vec{V}_{14}$ selected from a combination of voltage switching vectors $\vec{V}_1$, $\vec{V}_2$, $\vec{V}_3$, $\vec{V}_4$, $\vec{V}_{13}$, $\vec{V}_{14}$, $\vec{V}_{15}$, $\vec{V}_{16}$, and set a matrix $[\vec{V}_{14}, \vec{V}_{14} \times \vec{V}_{13} \times \vec{V}_{14}, \vec{V}_{13} \times \vec{V}_{14}]^T$ configured of any one voltage switching vector among $\vec{V}_{14}$ the two voltage switching vectors $\vec{V}_{13}$, $\vec{V}_{14}$, a cross product $\vec{V}_{14} \times N_U = \vec{V}_{14} \times \vec{V}_{13} \times \vec{V}_{14}$ of the voltage switching vector $\vec{V}_{14}$ and the normal vector NU, and the normal vector $N_U = \vec{V}_{13} \times \vec{V}_{14}$ as the rotation transformation matrix RU.

Specifically, considering the values of the two voltage switching vectors $\vec{V}_{13}$, $\vec{V}_{14}$ of FIG. 3a, the normal vector NU and the rotation transformation matrix RU may be calculated as shown in the following equations.

$$\vec{N}_U = \vec{V}_{14} \times \vec{V}_{13} = \quad \text{[Equation 2]}$$
$$(1/\sqrt{6}, -1/\sqrt{2}, -1/\sqrt{3}) \times (\sqrt{2}/\sqrt{3}, 0, -2/\sqrt{3}) =$$
$$(\sqrt{2}/\sqrt{3}, 0, 1/\sqrt{3})$$

$$R_U = \begin{bmatrix} \vec{V}_{14} \\ \vec{V}_{14} \times \vec{V}_{13} \times \vec{V}_{14} \\ \vec{V}_{14} \times \vec{V}_{13} \end{bmatrix} = \begin{bmatrix} 1/\sqrt{6} & -1/\sqrt{2} & -1/3 \\ 1/\sqrt{6} & 1/\sqrt{2} & -1/\sqrt{3} \\ \sqrt{2}/\sqrt{3} & 0 & 1/\sqrt{3} \end{bmatrix} \quad \text{[Equation 3]}$$

In addition, a normal vector Nv and a rotation transformation matrix Rv may be calculated in the same way for the graph showing a combination of voltage switching vectors when a V-phase line-to-ground fault occurs as shown in the following equations.

$$\vec{n}_V = \vec{V}_5 \times \vec{V}_6 = \quad \text{[Equation 4]}$$
$$(\sqrt{2}/\sqrt{3}, 0, 1/\sqrt{3}) \times (1/\sqrt{6}, -1/\sqrt{2}, 2/\sqrt{3}) =$$
$$(-1/\sqrt{6}, -\sqrt{2}/2, -1/\sqrt{3})$$

$$R_V = \begin{bmatrix} \vec{V}_5 \\ \vec{V}_5 \times \vec{V}_6 \times \vec{V}_5 \\ \vec{V}_5 \times \vec{V}_6 \end{bmatrix} = \begin{bmatrix} \sqrt{2}/\sqrt{3} & 0 & 1/\sqrt{3} \\ -1/\sqrt{6} & -1/\sqrt{2} & 1/\sqrt{3} \\ 1/\sqrt{6} & -\sqrt{2}/2 & -1/\sqrt{3} \end{bmatrix} \quad \text{[Equation 5]}$$

In addition, a normal vector Nw and a rotation transformation matrix Rw may be calculated in the same way for the graph showing a combination of voltage switching vectors when a W-phase line-to-ground fault occurs as shown in the following equations.

$$\vec{N}_W = \qquad \text{[Equation 6]}$$
$$\vec{V}_5 \times \vec{V}_7 = (\sqrt{2}/\sqrt{3}, 0, 1/\sqrt{3}) \times (1/\sqrt{6}, 1/\sqrt{2}, 2/\sqrt{3}) =$$
$$(-1/\sqrt{6}, -1/\sqrt{2}, 1/\sqrt{3})$$

$$R_W = \begin{bmatrix} \vec{V}_5 \\ \vec{V}_5 \times \vec{V}_7 \times \vec{V}_5 \\ \vec{V}_5 \times \vec{V}_7 \end{bmatrix} = \begin{bmatrix} \sqrt{2}/\sqrt{3} & 0 & 1/\sqrt{3} \\ -1/\sqrt{6} & 1/\sqrt{2} & 1/\sqrt{3} \\ -1/\sqrt{6} & -1/2 & 1/\sqrt{3} \end{bmatrix} \quad \text{[Equation 7]}$$

When the normal vector NU and the rotation transformation matrix RU are calculated as described above, through this, rotation transformation may be performed on an inclined plane in each graph showing a combination of voltage switching vectors when distortions due to a single line-to-ground fault, i.e., U-phase, V-phase, or W-phase line-to-ground fault, occur.

Meanwhile, a phase adjustment matrix Padj for reducing a phase difference of 120 degrees of the product of the rotation transformation matrix RU to 90 degrees may be as shown in the following equation.

$$P_{adj} = (2/\sqrt{3}) \begin{bmatrix} \sqrt{3}/2 & 0 & 0 \\ 1/2 & 1 & 0 \\ 0 & 0 & \sqrt{3}/2 \end{bmatrix} \quad \text{[Equation 8]}$$

Hereinafter, a method of transforming distortion factors generated due to a line-to-ground fault into stationary components according to the present invention will be described with reference to the drawings.

Figure 6A:
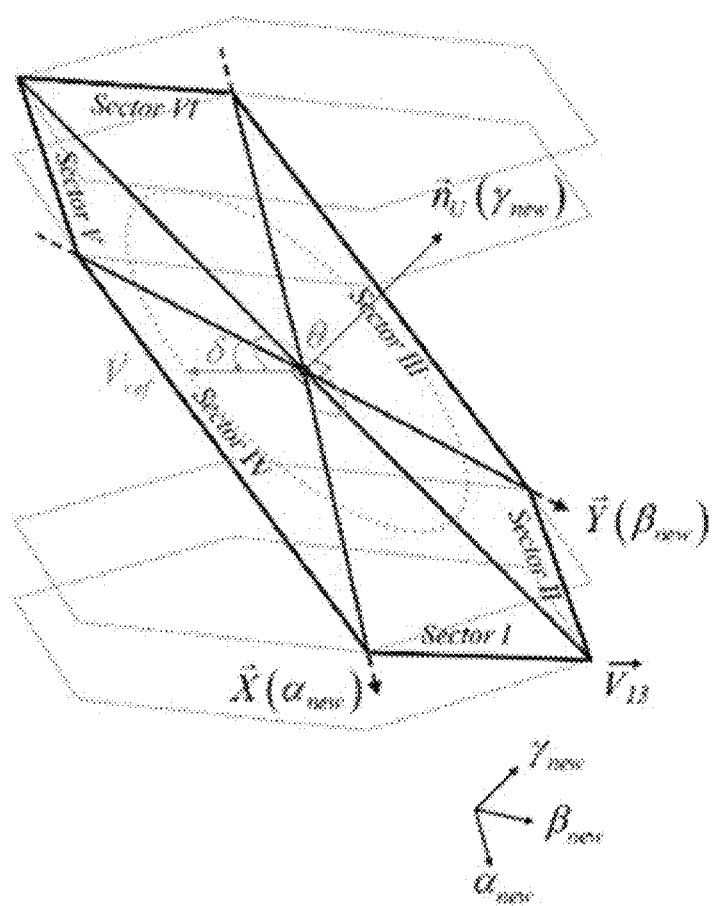
FIG. 6A is a view for explaining a three-dimensional plane before projection.
Figure 6B:
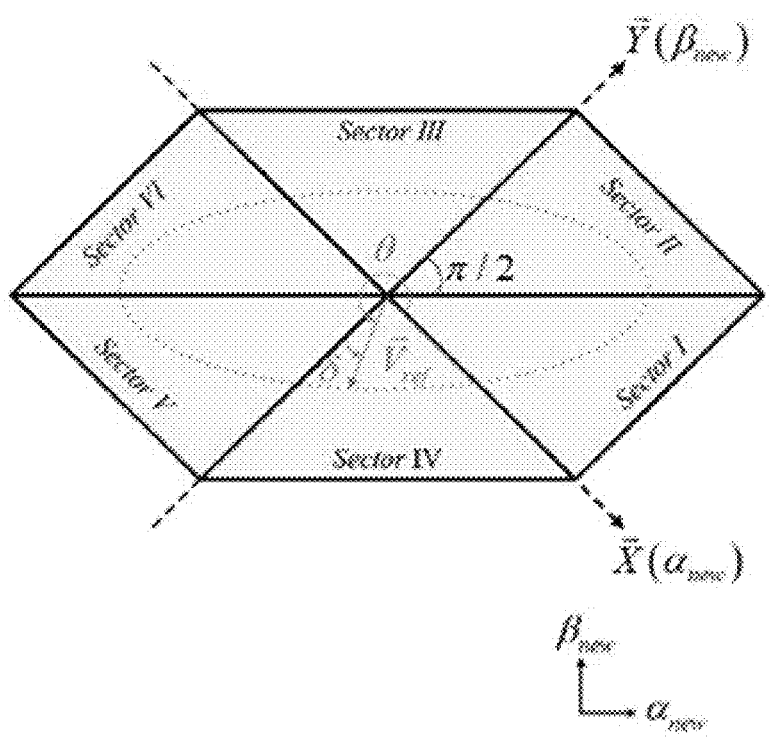
FIG. 6B is a view for explaining a two-dimensional plane after projection.

FIG. 6a is a view for explaining a three-dimensional plane before projection, and FIG. 6b is a view for explaining a two-dimensional plane after projection.

In a way similar to the method shown in FIGS. 3b and 3c, as shown in FIGS. 6a and 6b, in a method of transforming distortion factors generated due to a line-to-ground fault into stationary components, a plane in a three-dimensional voltage vector space before projection may be projected as a two-dimensional SVPWM plane after the projection.

However, when a single line-to-ground fault occurs, the voltage vector area of the two-dimensional plane after projection may have a distorted hexagonal shape, unlike the regular hexagonal shape of the two-dimensional SVPWM plane in the case of balanced three-phase.

With regard to the distorted hexagonal area, the voltage vector area on the two-dimensional SVPWM plane may be a distorted hexagonal area formed by a combination of voltage switching vectors that make the switching state of phase 1 (U) the same as the switching state of phase n, and the reference sector may be any one among six triangular sectors generated by dividing the distorted hexagonal area.

As described, in the case of a single line-to-ground fault, since the voltage vector area on the two-dimensional SVPWM plane may be a distorted hexagonal area rather than a regular hexagonal area, it may be required to perform a process of calculating duty ratios d1, d2, and d0 for expressing the reference vector $\vec{V}_{ref}$ in a separate method suitable for this.

Which sector among the six triangular sectors generated by dividing the distorted hexagonal area corresponds to the reference sector on the two-dimensional SVPWM plane may be determined through the following equations.

$$X \geq 0 \begin{cases} X \geq 0 \begin{cases} |Y| \leq |X| (\text{sector} = 1) \\ |Y| > |X| (\text{sector} = 2) \end{cases} \\ X < 0 \quad (\text{sector} = 3) \end{cases} \quad \text{[Equation 9]}$$

$$Y < 0 \begin{cases} X < 0 \begin{cases} |Y| \leq |X| (\text{sector} = 4) \\ |Y| > |X| (\text{sector} = 5) \end{cases} \\ X > 0 \quad (\text{sector} = 6) \end{cases}$$

Hereinafter, a process of calculating duty ratios for expressing a reference vector as effective switching vectors according to the present invention will be described with reference to the drawings.

Figure 7:
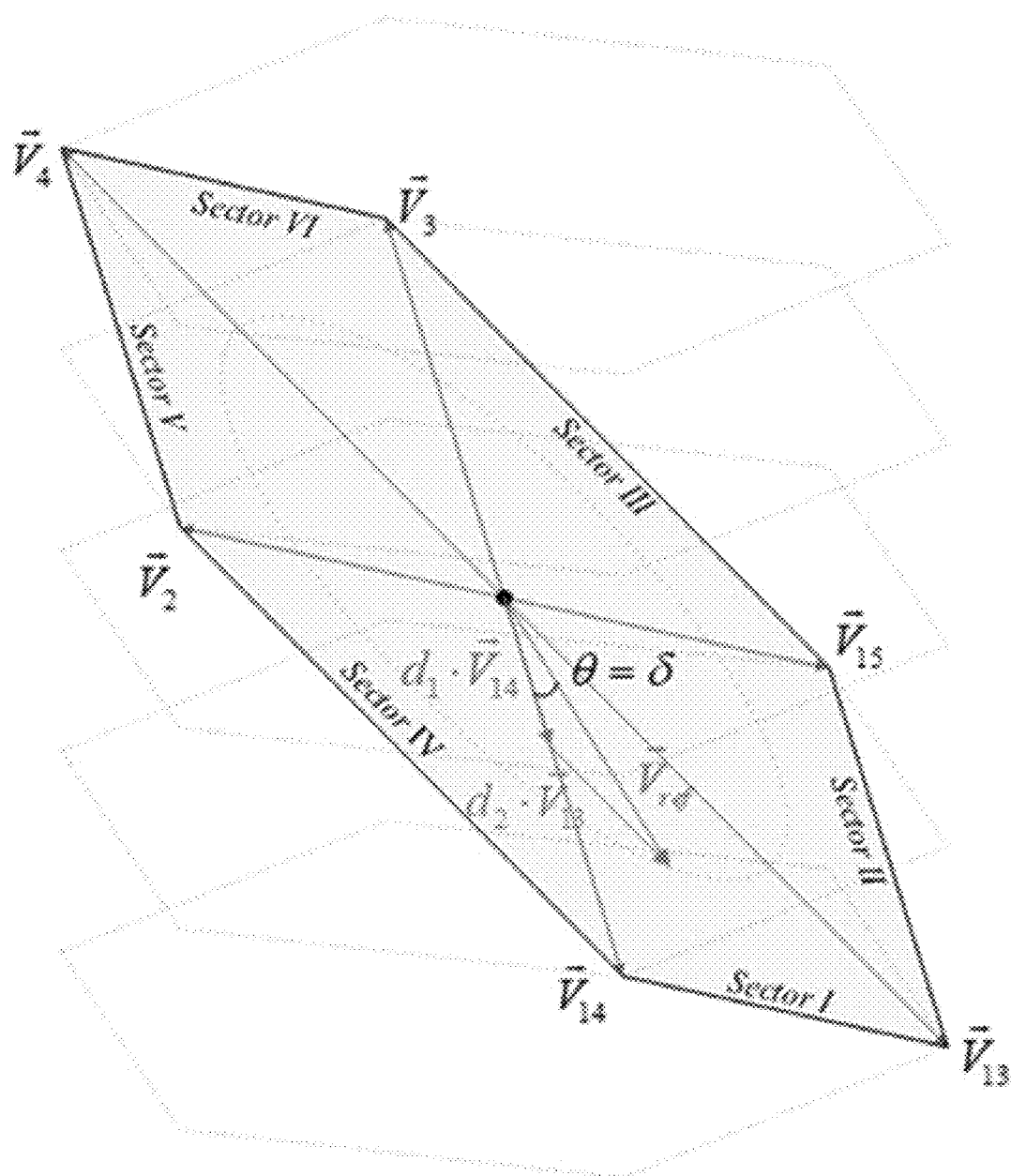
FIGS. 7 to 9 are views for explaining a process of calculating duty ratios for expressing a reference vector as effective switching vectors according to the present invention.
Figure 8:
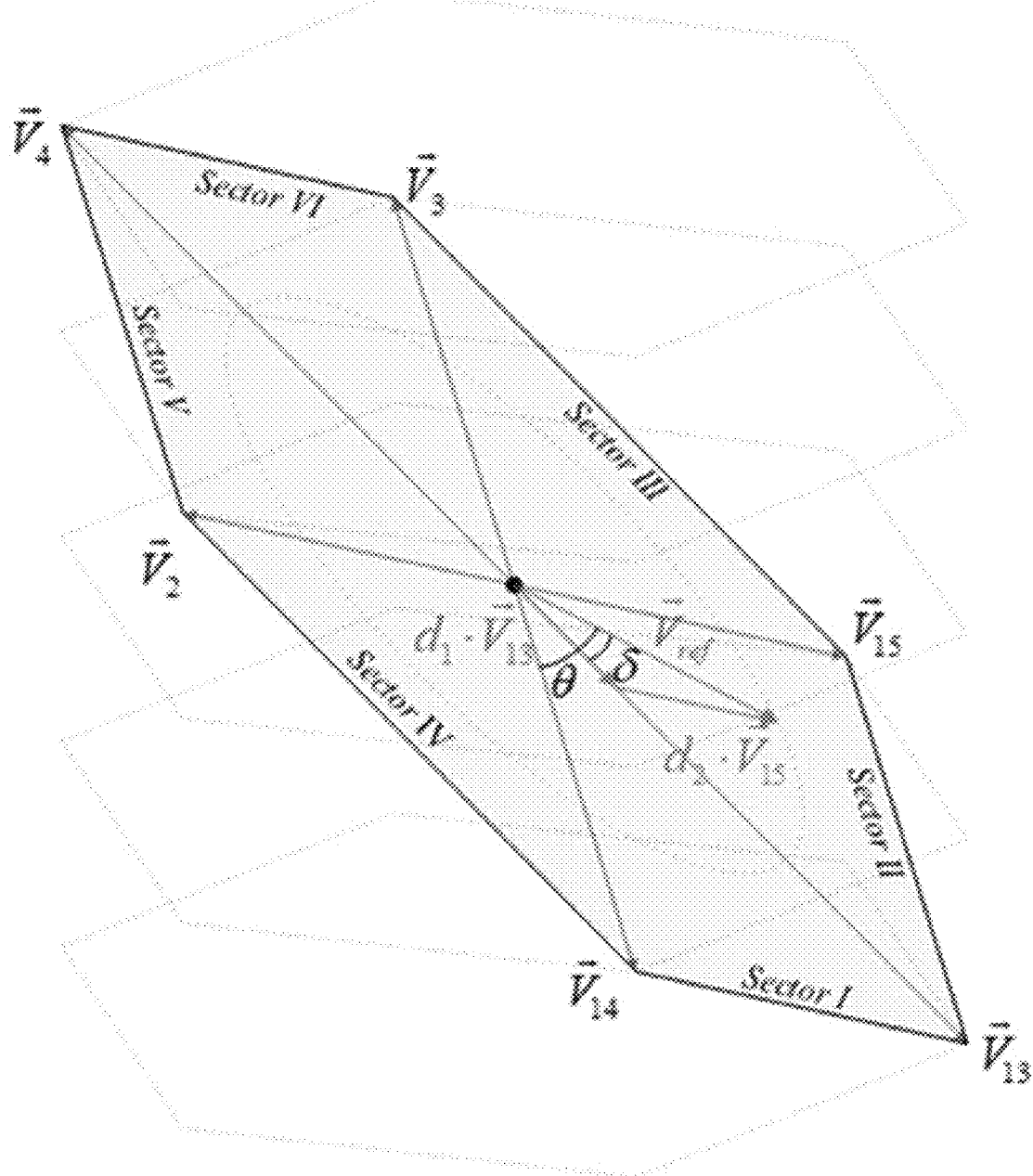
Figure 9:
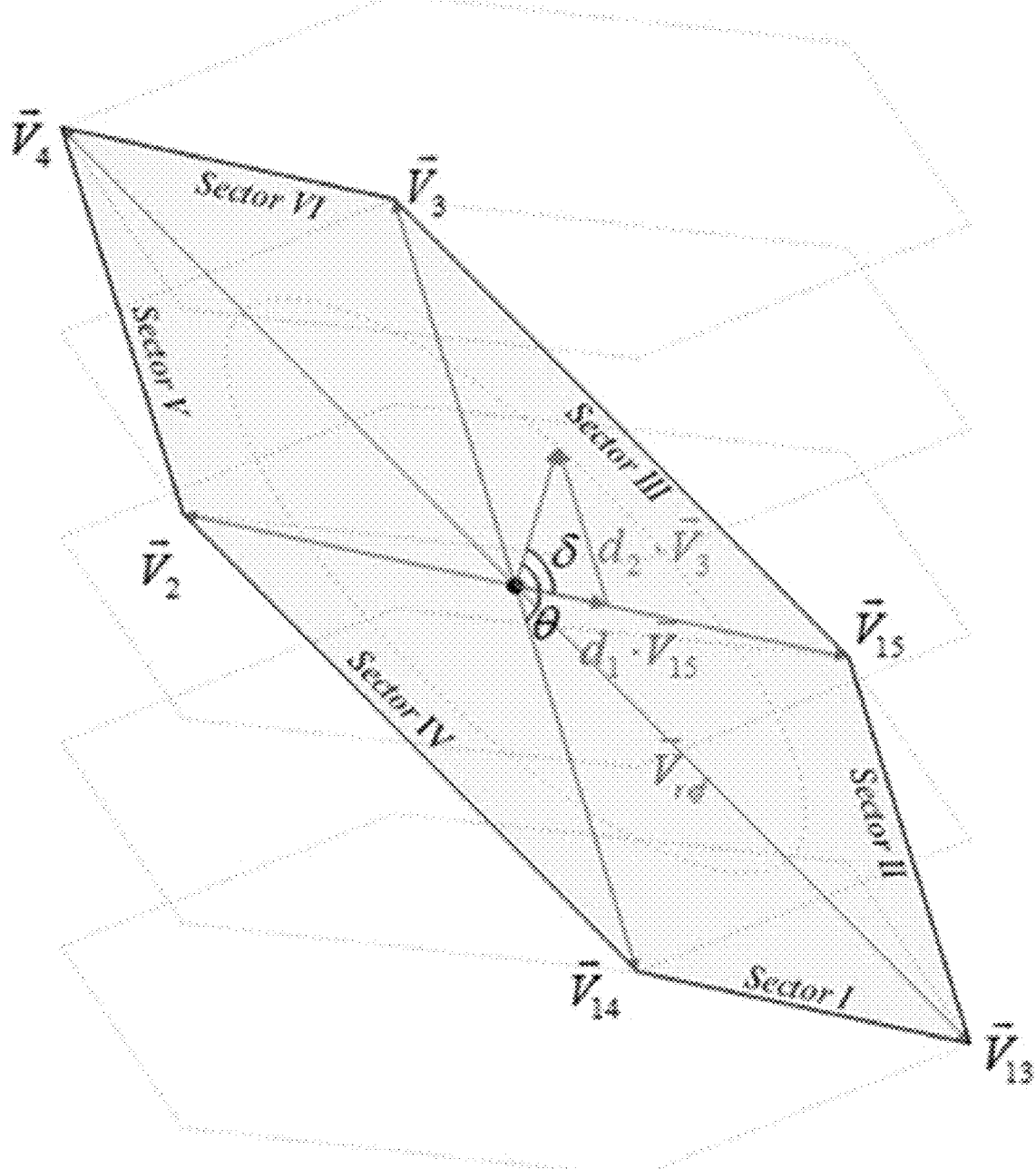

FIGS. 7 to 9 are views for explaining a process of calculating duty ratios for expressing a reference vector as effective switching vectors according to the present invention.

As shown in FIGS. 7 to 9, graphs for explaining the process of calculating duty ratios for expressing a reference vector as effective switching vectors according to the present invention may be shown.

FIG. 7 may correspond to sector 1 among six sectors, FIG. 8 may correspond to sector 2 among six sectors, and FIG. 9 may correspond to sector 3 among six sectors. Duty ratios of sectors 4, 5, and 6 may be calculated in a manner similar to that of sectors 1, 2, and 3, respectively.

First, in the graph for section 1 of FIG. 7, the reference vector $\vec{V}_{ref}$ may be expressed by two effective switching vectors $\vec{V}_{14}$ and $\vec{V}_{15}$ duty ratios d1 and d2 corresponding to sector 1 as shown in the following equations. Here, θ may mean a rotation angle centered on axis a, and δ may mean a rotation angle in each sector.

$$\vec{V}_{ref} = d_1 \vec{V}_{14} + d_2 \vec{V}_{13} \quad \text{[Equation 10]}$$

$$d_1 = |\vec{V}_{ref}/\vec{V}_{14}|[\cos(\delta) - \sin(\delta)]$$

$$d_2 = |\sqrt{2}\vec{V}_{ref}/\vec{V}_{15}|\sin(\delta) \quad \text{[Equation 11]}$$

In the same manner, in the graph for sector 2 of FIG. 8, the reference vector $\vec{V}_{ref}$ may be expressed by two effective switching vectors $\vec{V}_{13}$ and $\vec{V}_{15}$ duty ratios d1 and d2 corresponding to sector 2 as shown in the following equations.

$$\vec{V}_{ref} = d_1 \vec{V}_{13} + d_2 \vec{V}_{15} \quad \text{[Equation 12]}$$

$$d_1 = |\vec{V}_{ref}/\vec{V}_{13}|[\cos(\delta) - \sin(\delta)]$$

$$d_2 = |\sqrt{2}\vec{V}_{ref}/\vec{V}_{15}|\sin(\delta) \quad \text{[Equation 13]}$$

In the same manner, in the graph for sector 3 of FIG. 9, the reference vector $\vec{V}_{ref}$ may be expressed by two effective switching vectors $\vec{V}_{15}$ and $\vec{V}_3$ duty ratios d1 and d2 corresponding to sector 3 as shown in the following equations.

$$\vec{V}_{ref} = d_1 \vec{V}_{15} + d_2 \vec{V}_3 \quad \text{[Equation 14]}$$

$$d_1 = |\vec{V}_{ref}/\vec{V}_3|\cos(\delta)$$

$$d_2 = |\vec{V}_{ref}/\vec{V}_{12}|\sin(\delta) \quad \text{[Equation 15]}$$

Hereinafter, a generalized process of calculating duty ratios according to the present invention will be described with reference to the drawings.

FIG. 10 is a view for explaining a generalized process of calculating duty ratios according to the present invention.

The process of calculating the duty ratios individually calculated for each sector in Equations 10 to 15 may be summarized as a general formula by utilizing the variables shown in FIG. 10.

Specifically, the calculation unit 223 may be configured to calculate, when duty ratios d1, d2, and d0 are calculated, the duty ratios d1, d2, and d0 for the effective switching vectors $\vec{V}_A$ and $\vec{V}_B$, fixed coordinate system elements ($\vec{V}_{\alpha a}{}^*$, $\vec{V}_{\beta z}{}^*$) of the two-dimensional SVPWM plane, and the conversion constant n of each sector according to Equations 16 to 18 shown below.

$$\begin{cases} d_1 = \frac{1}{|\vec{V}_A|}\left[V^*_{\alpha s}(\cos(n\pi) + \sin(n\pi)) + V^*_{\beta s}(\sin(n\pi)) - \cos(n\pi))\right] \\ d_2 = \frac{\sqrt{2}}{|\vec{V}_B|}\left[V^*_{\beta s}\cos(n\pi) - V^*_{\alpha s}\sin(n\pi)\right] \end{cases}$$

[Equation 16]

if sector = 1, 2, 4, 5

$$\begin{cases} d_1 = \frac{1}{|\vec{V}_A|}\left[V^*_{\alpha s}\cos(n\pi) + V^*_{\beta s}\sin(n\pi)\right] \\ d_2 = \frac{1}{|\vec{V}_B|}\left[V^*_{\beta s}\cos(n\pi) - V^*_{\alpha s}\sin(n\pi)\right] \end{cases}, \text{ if sector} = 3, 6$$

[Equation 17]

$$d_0 = 1 - d_1 - d_2$$

[Equation 18]

Meanwhile, the value of the conversion constant n for each sector may be set as shown in FIG. 10.

Hereinafter, a method of determining an order of applying voltage vectors by arranging effective switching vectors and zero vectors according to the present invention will be described with reference to the drawings.

Figure 11:
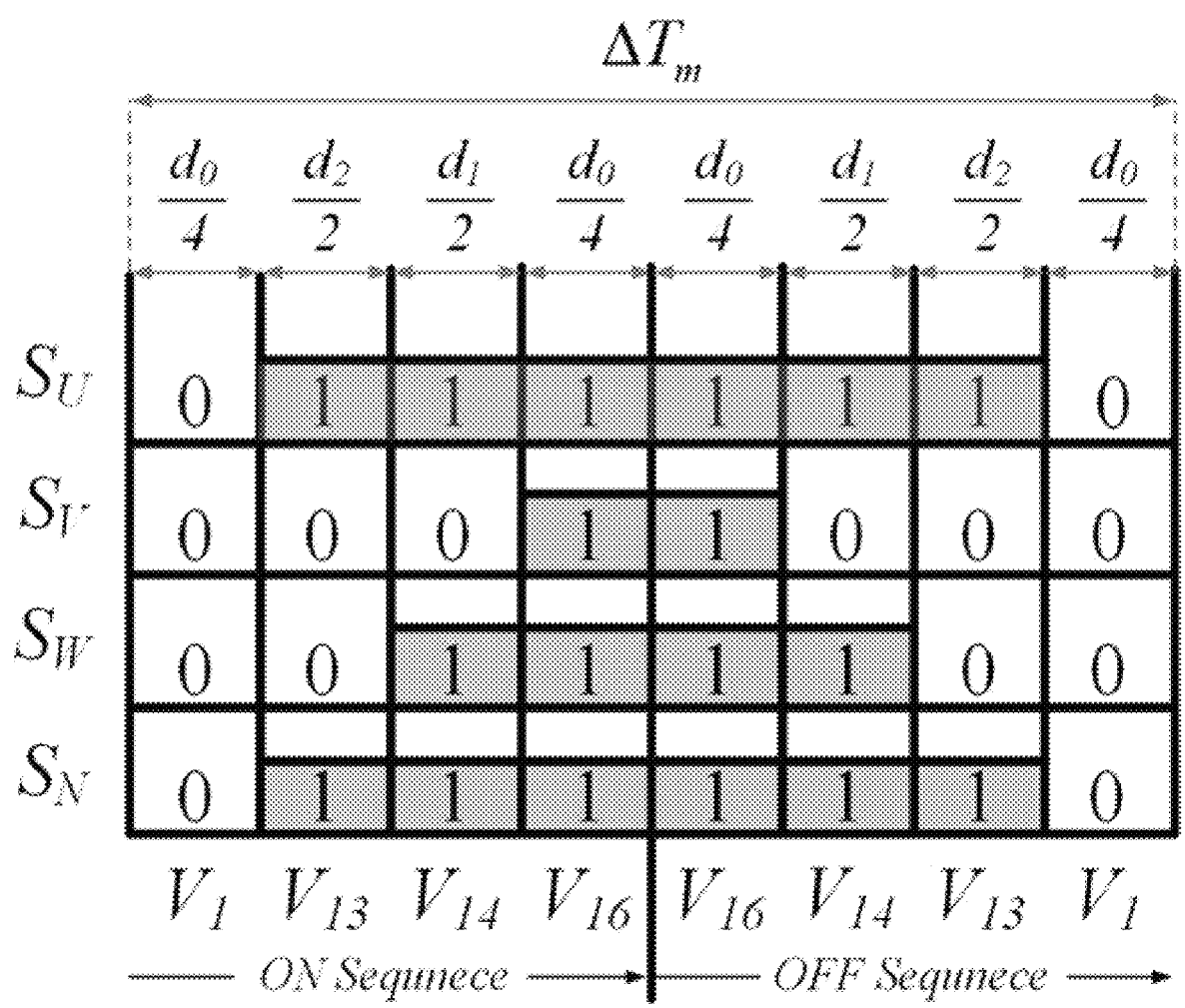
FIG. 11 is a view for explaining a method of determining an order of applying voltage vectors by arranging effective switching vectors and zero vectors according to the present invention.

FIG. 11 is a view for explaining a method of determining an order of applying voltage vectors by arranging effective switching vectors and zero vectors according to the present invention.

Referring to FIG. 11, it is a graph for explaining a method of determining an order of applying voltage vectors by arranging effective switching vectors and zero vectors according to the present invention, and shows an example of a case where the reference vector is located in sector 1 as shown in FIG. 7 when a single line-to-ground fault occurs in phase U.

That is, FIG. 11 may mean an order of applying voltage vectors showing in which order effective switching vectors $\vec{V}_{14}$ and $\vec{V}_{13}$ zero vectors $\vec{V}_1$ and $\vec{V}_{16}$ corresponding to sector 1 are applied to the 3-phase 4-leg inverter 100 during the modulation period $\Delta T_m$.

With regard to the order of applying voltage vectors of FIG. 11, the determination unit 229 may be configured to arrange effective switching vectors $\vec{V}_A$ and $\vec{V}_B$ and zero vectors $\vec{V}_1$ and $\vec{V}_{16}$ in a symmetrically aligned modulation scheme, in which when the order of applying voltage vectors is determined, the on-sequence at the front end of the modulation period $\Delta T_m$ is symmetrical to the off-sequence at the rear end, and the effective switching vectors $\vec{V}_A$ and $\vec{V}_B$ are located at the center of the front-end on-sequence and at the center of the rear-end off-sequence.

When the symmetrically aligned modulation scheme is used as described above, compared with a case of using other array schemes, i.e., compared with a case in which the effective switching vectors $\vec{V}_A$ and $\vec{V}_B$ (in this case, $\vec{V}_{14}$ and $\vec{V}_{13}$) are not located at the center, and the front-end on-sequence is not symmetrical to the rear-end off-sequence, harmonic characteristics can be improved.

Hereinafter, the effect of the space vector pulse width modulation control method according to the present invention will be described with reference to the drawings.

Figure 12A:
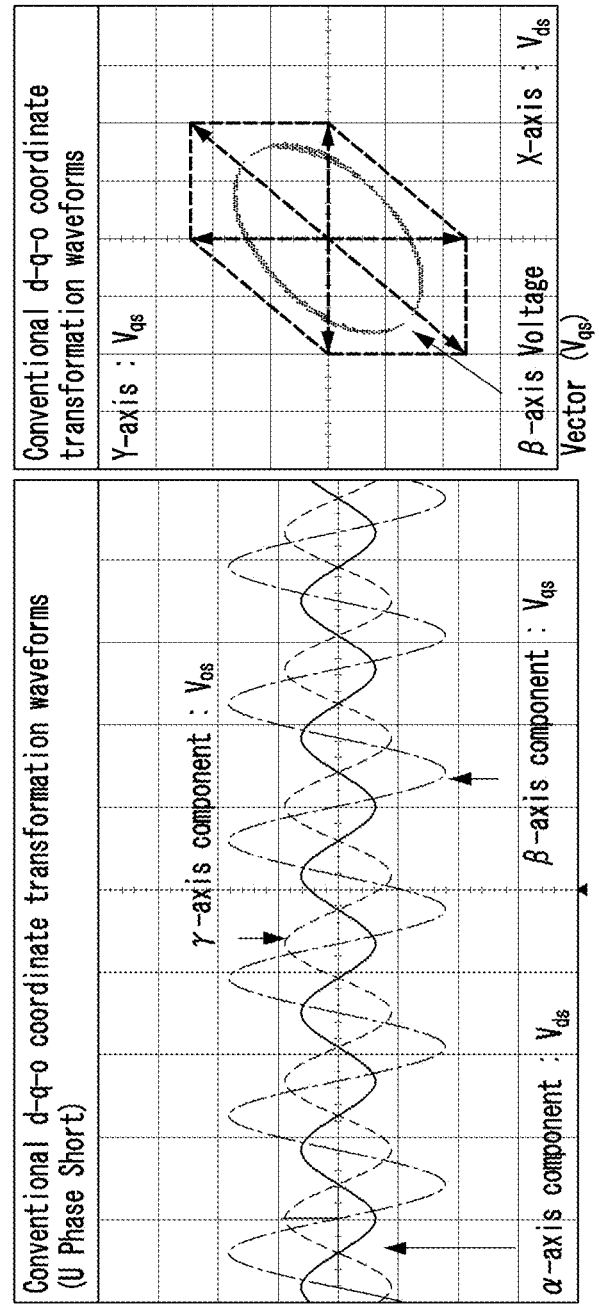
FIG. 12A is a view for explaining a graph showing an experiment result of a method of transforming into stationary components.
Figure 12B:
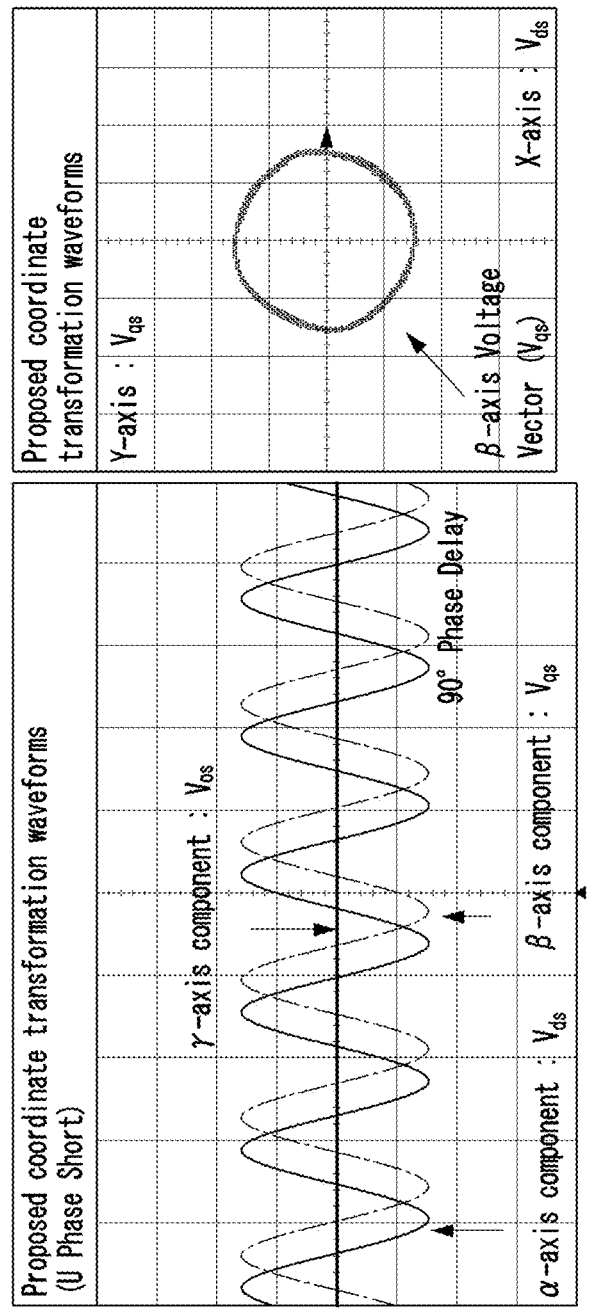
FIG. 12B is a view for explaining a U-phase line-to-ground fault graph.

FIG. 12a is a view for explaining a graph showing an experiment result of a method of transforming into stationary components, and FIG. 12b is a view for explaining a U-phase line-to-ground fault graph.

Referring to FIGS. 12a and 12b, a graph showing an experiment result of the coordinate transformation scheme according to the present invention, i.e., a method of transforming distortion factors generated due to a line-to-ground fault into stationary components by applying a rotation transformation matrix RU and a phase adjustment matrix Padj to a result of three-phase alpha-beta transformation TClarke, may be compared with the U-phase line-to-ground fault graph.

In FIG. 12, it may be confirmed that, zero voltage is applied to phase U (since a combination of voltage switching vectors that make the switching state of phase 1 (U), in which a line-to-ground fault has occurred, the same as the switching state of phase n is selected), and the phase difference between phase V and phase W is 90 degrees unlike the U-phase line-to-ground fault graph, and it may be confirmed that the coordinate transformation has been properly performed even in the alpha-beta plane shown on the right side.

Figure 13A:
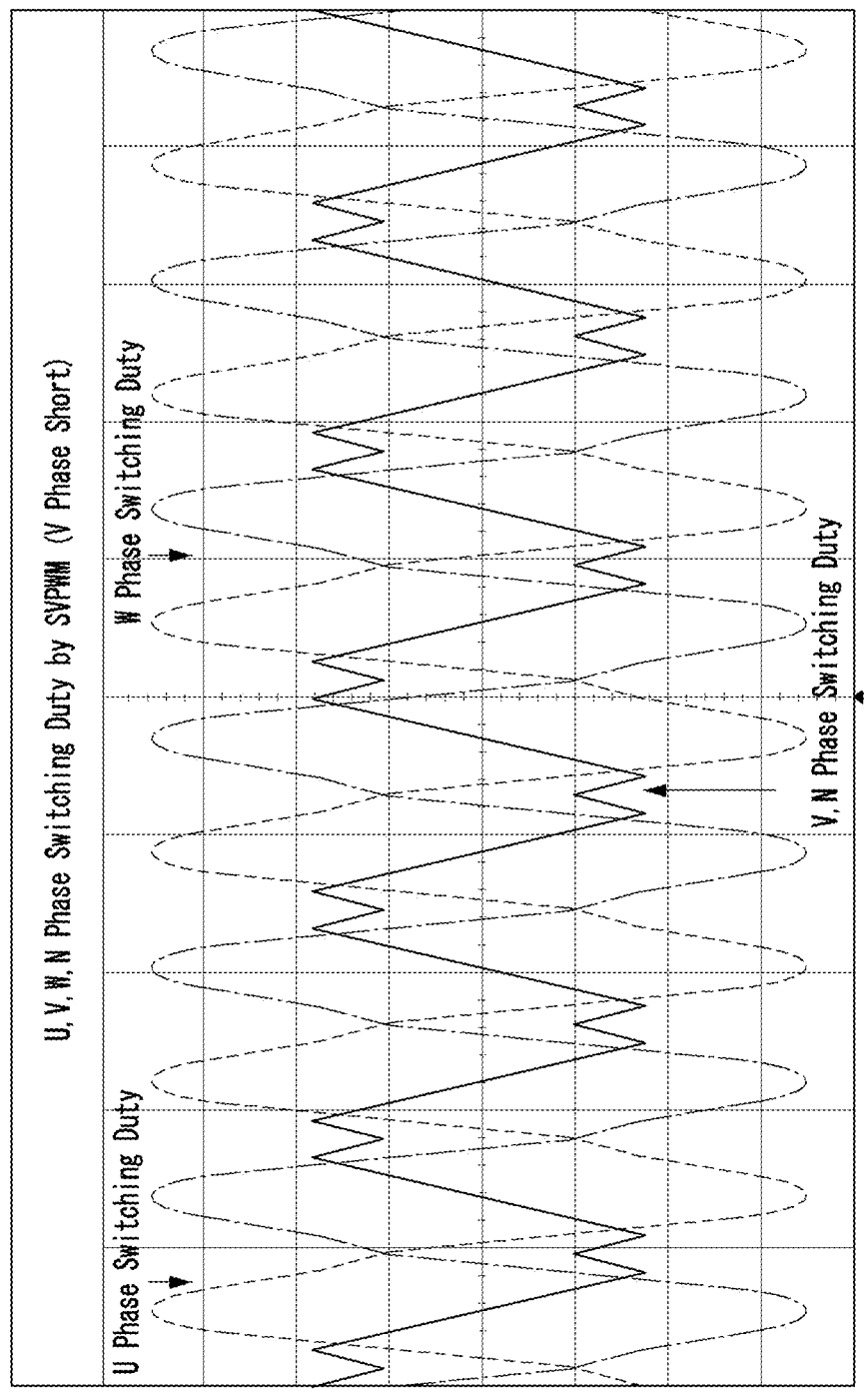
FIG. 13A is a view for explaining a graph showing a switching duty of each phase applied to a 3-phase 4-leg inverter according to the SVPWM control technique.
Figure 13B:
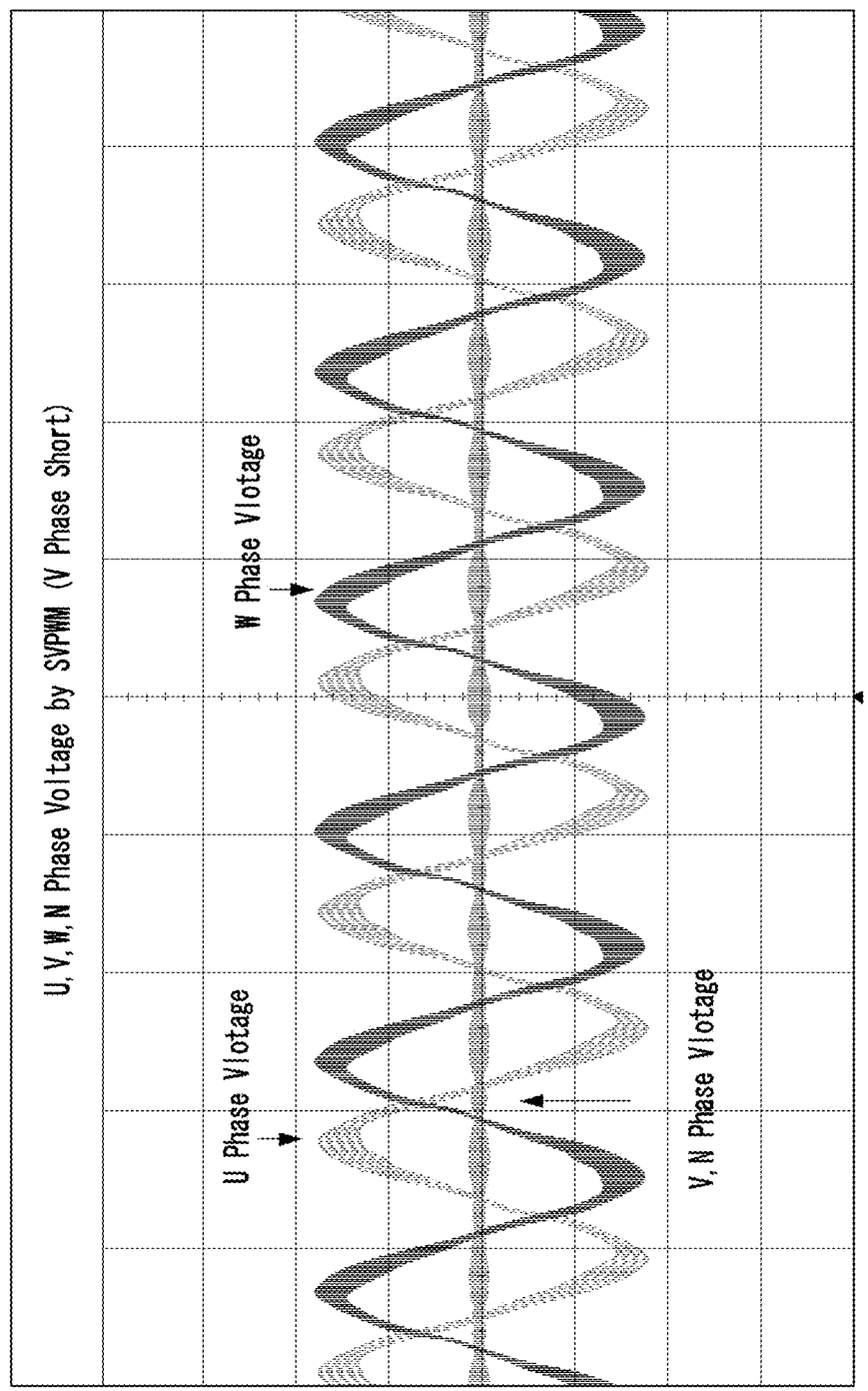
FIG. 13B is a view for explaining a voltage graph of each phase measured by the SVPWM control technique.
Figure 13C:
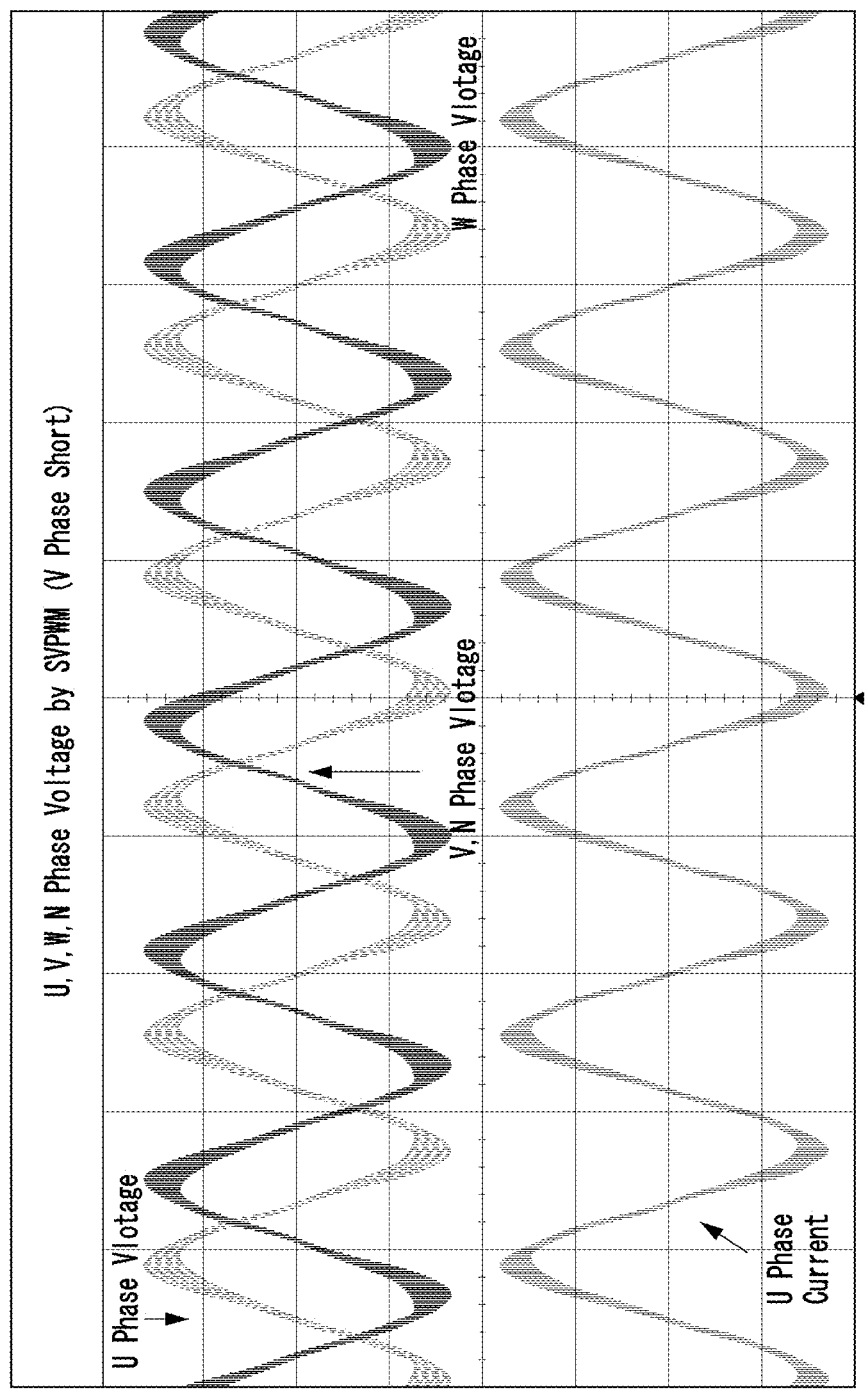
FIG. 13C is a view for explaining a current graph of each phase measured by the SVPWM control technique.

FIG. 13a is a view for explaining a graph showing a switching duty of each phase applied to a 3-phase 4-leg inverter according to the SVPWM control technique, FIG. 13b is a view for explaining a voltage graph of each phase measured by the SVPWM control technique, and FIG. 13c is a view for explaining a current graph of each phase measured by the SVPWM control technique.

Referring to FIGS. 13a to 13c, it can be confirmed that sound phases (in this case, phase U and phase W), in which a line-to-ground fault does not occur as shown in the voltage graph of FIG. 13b and the current graph of FIG. 13c, may operate normally without unnecessary power failure through the SVPWM switching control as shown in FIG. 13a even when a single line-to-ground fault occurs in phase V.

Hereinafter, the steps constituting a space vector pulse width modulation control method according to the present invention will be described with reference to the drawings.

Figure 14:
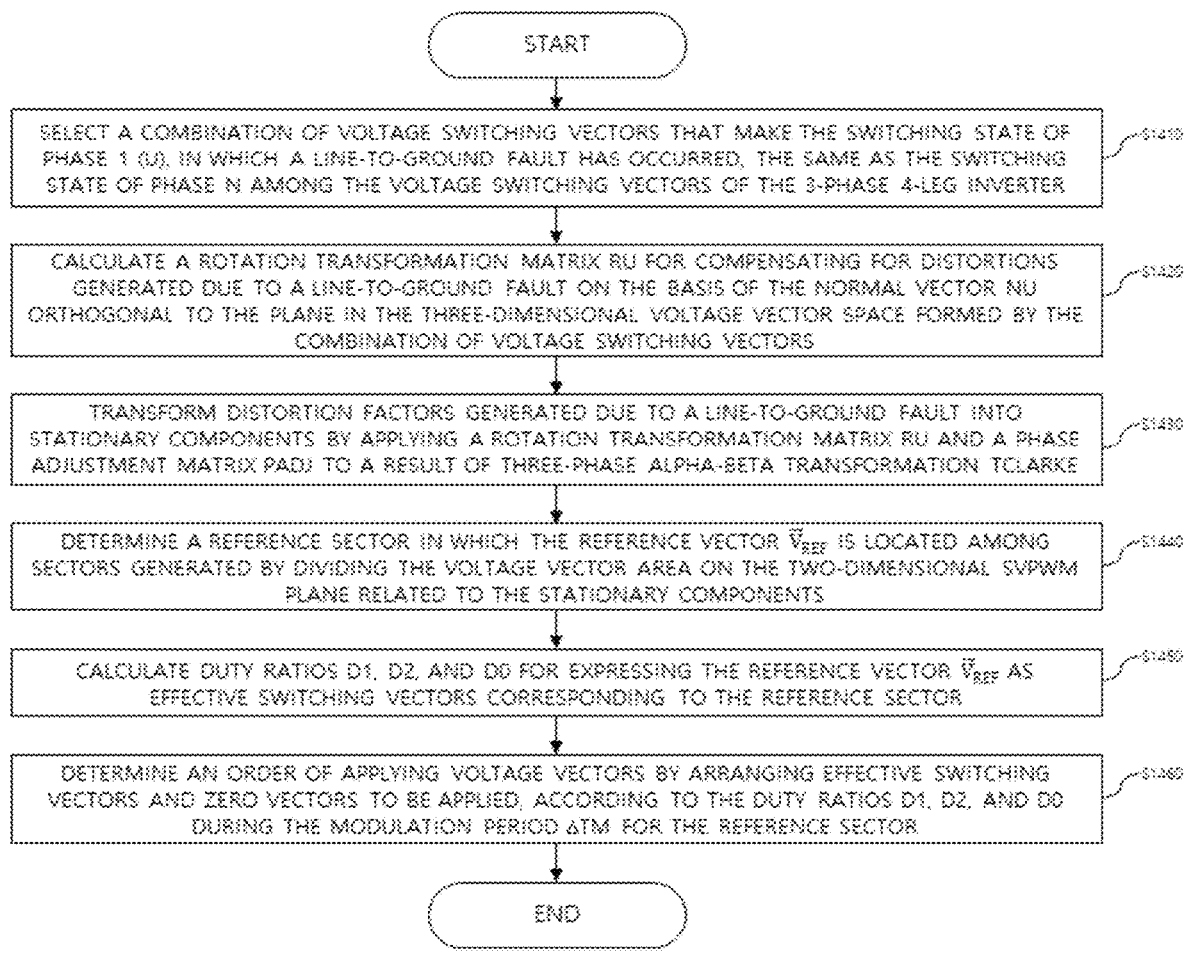
FIG. 14 is a flowchart illustrating the steps constituting a space vector pulse width modulation control method according to the present invention.

FIG. 14 is a flowchart illustrating the steps constituting a space vector pulse width modulation control method according to the present invention.

Referring to FIG. 14, the space vector pulse width modulation control method using the 3-phase 4-leg inverter 100 under a single line-to-ground fault in an islanded microgrid may include steps 1410 to 1460. However, it is not limited thereto, and other generalized steps may be further included in the space vector pulse width modulation control method.

The space vector pulse width modulation control method may be configured of steps processed in time series in the space vector pulse width modulation control device 200. Therefore, even when some of the contents are omitted below, the description of the space vector pulse width modulation control device 200 may be equally applied to the space vector pulse width modulation control method.

The space vector pulse width modulation control method using the 3-phase 4-leg inverter 100 under a single line-to-ground fault in the islanded microgrid may be performed by the processor 220 executing the instructions stored in the memory 210.

At step 1410, the space vector pulse width modulation control device 200 may select a combination of voltage switching vectors that make the switching state of phase 1 (U), in which a line-to-ground fault has occurred, the same as the switching state of phase n among the voltage switching vectors of the 3-phase 4-leg inverter.

At step 1420, the space vector pulse width modulation control device 200 may calculate a rotation transformation matrix RU for compensating for distortions generated due to a line-to-ground fault on the basis of a normal vector NU orthogonal to the plane in the three-dimensional voltage vector space formed by the combination of voltage switching vectors.

At step 1430, the space vector pulse width modulation control device 200 may transform distortion factors generated due to a line-to-ground fault into stationary components by applying the rotation transformation matrix RU and the phase adjustment matrix Padj to a result of the three-phase alpha-beta transformation TClarke.

At step 1440, the space vector pulse width modulation control device 200 may determine a reference sector in which the reference vector $\vec{V}_{ref}$ is located, among sectors generated by dividing the voltage vector area on the two-dimensional SVPWM plane related to the stationary components.

At step 1430, the space vector pulse width modulation control device 200 may calculate duty ratios d1, d2, and d0 for expressing the reference vector $\vec{V}_{ref}$ as effective switching vectors corresponding to the reference sector.

At step 1430, the space vector pulse width modulation control device 200 may determine an order of applying voltage vectors by arranging effective switching vectors and zero vectors to be applied, according to the duty ratios d1, d2, and d0 during the modulation period Δ Tm for the reference sector.

Meanwhile, the method of controlling space vector pulse width modulation using a 3-phase 4-leg inverter 100 under a single line-to-ground fault in an islanded microgrid according to some embodiments of the present invention may be implemented in the form of a computer program stored in a computer-readable storage medium.

That is, the computer program may include instructions that allow a processor to perform the space vector pulse width modulation control method when executed, and the instructions of the computer program may be stored in a computer-readable storage medium. The computer program may include mobile applications.

For example, the computer-readable storage medium includes magnetic media such as hard disks, floppy disks, and magnetic tapes, optical media such as CD-ROMs and DVDs, magneto-optical media such as floptical disks, and hardware devices specially configured to store and execute computer program instructions such as ROM, RAM, flash memory, and the like. The computer program instructions may include machine language codes generated by a compiler and high-level language codes that can be executed by a computer using an interpreter.

According to the device, method, and computer program of the present invention for controlling space vector pulse width modulation using a 3-phase 4-leg inverter under a single line-to-ground fault in an islanded microgrid, since available voltage switching vectors are limited as phase 1, in which a line-to-ground fault has occurred, and phase n are restricted to have the same switching state, a novel coordinate transformation may be performed to compensate for the distortions generated therefrom, and since a novel space vector pulse width modulation (SVPWM) method that can be appropriately applied to the transformed coordinates can be provided, the problem of inducing loss of power and reducing the life of devices by unnecessarily cutting off even the sound phases can be solved even when a line-to-ground fault occurs.

Although the embodiments of the present invention have been described above in detail, the scope of rights according to the present invention is not limited thereto, and various modifications and improvements of those skilled in the art using the basic concept of the present invention described in the following claims should also be construed as being included in the scope of the rights according to the present invention.

What is claimed is:

1. A device for controlling space vector pulse width modulation using a 3-phase 4-leg inverter under a single line-to-ground fault in an islanded microgrid, the device comprising:
a memory configured to store instructions; and
a processor for selecting a combination of voltage switching vectors on the basis of voltage switching vectors of the 3-phase 4-leg inverter, transforming distortion factors into stationary components through a rotation transformation matrix and a phase adjustment matrix for compensating for distortions generated by the line-to-ground fault, and controlling space vector pulse width modulation switching for transformed coordinates,
wherein the processor includes:
a selection unit for selecting the combination of voltage switching vectors on the basis of a switch state of each phase in which the single line-to-ground fault has occurred among the voltage switching vectors of the 3-phase 4-leg inverter;
a calculation unit for calculating a normal vector on the basis of the combination of voltage switching vectors, calculating the rotation transformation matrix on the basis of the normal vector, and calculating duty ratios on the basis of a reference sector;

a transform unit for transforming the distortion factors into the stationary components to be projected onto a two-dimensional SVPWM plane in a three-dimensional voltage vector space;
a setting unit for setting the reference sector in which a reference vector is located, among sectors generated by dividing a voltage vector area on the two-dimensional SVPWM plane; and
a determination unit for determining an order of applying voltage vectors on the basis of the duty ratios.

2. The device according to claim 1, wherein the selection unit selects the combination of voltage switching vectors that make a switching state of phase 1, in which a line-to-ground fault has occurred, the same as a switching state of phase n.

3. The device according to claim 1, wherein the calculation unit calculates the normal vector by performing a cross product on a plurality of voltage switching vectors selected from the combination of voltage switching vectors, and calculates a matrix configured of any one voltage switching vector among the plurality of voltage switching vectors, a cross product of the voltage switching vector and the normal vector, and the normal vector as the rotation transformation matrix.

4. The device according to claim 3, wherein the normal vector is a vector orthogonal to a plane in a three-dimensional voltage vector space formed by the combination of voltage switching vectors.

5. The device according to claim 1, wherein the calculation unit calculates the duty ratios for expressing the reference vector as effective switching vectors corresponding to the reference sector.

6. The device according to claim 1, wherein the transform unit transforms the distortion factors into the stationary components by performing coordinate transformation through the rotation transformation matrix and phase difference adjustment through the phase adjustment matrix.

7. The device according to claim 1, wherein the determination unit determines an order of applying voltage vectors for effective switching vectors and zero vectors to be applied, according to the duty ratios during a modulation period for the reference sector.

8. The device according to claim 7, wherein the determination unit switches the 3-phase 4-leg inverter during a time period according to a plurality of duty ratios for a plurality of effective switching vectors corresponding to the reference sector in which the reference vector is located.

9. The device according to claim 8, wherein the determination unit switches the 3-phase 4-leg inverter so that the zero vectors may be applied to the 3-phase 4-leg inverter during the duty ratio, which is a remaining time period excluding the plurality of duty ratios from the modulation period.

10. A method of controlling space vector pulse width modulation using a 3-phase 4-leg inverter under a single line-to-ground fault in an islanded microgrid, performed by a processor executing instructions stored in a memory, the method comprising the steps of:
selecting a combination of voltage switching vectors on the basis of voltage switching vectors of the 3-phase 4-leg inverter;
transforming distortion factors into stationary components through a rotation transformation matrix and a phase adjustment matrix for compensating for distortions generated by the line-to-ground fault; and
controlling space vector pulse width modulation switching for transformed coordinates,
wherein the step of transforming distortion factors into the stationary components includes the steps of:
calculating a normal vector by performing a cross product on a plurality of voltage switching vectors selected from the combination of voltage switching vectors;
calculating a matrix configured of any one voltage switching vector among the plurality of voltage switching vectors, a cross product of the voltage switching vector and the normal vector, and the normal vector as the rotation transformation matrix; and
transforming the distortion factors into the stationary components to be projected onto a two-dimensional SVPWM plane in a three-dimensional voltage vector space by performing coordinate transformation through the rotation transformation matrix and phase difference adjustment through the phase adjustment matrix.

11. The method according to claim 10, wherein the step of selecting the combination of voltage switching vectors includes the step of selecting the combination of voltage switching vectors on the basis of a switch state of each phase in which the single line-to-ground fault has occurred among the voltage switching vectors of the 3-phase 4-leg inverter.

12. The method according to claim 10, wherein the step of selecting the combination of voltage switching vectors includes the step of selecting the combination of voltage switching vectors that make a switching state of phase 1, in which a line-to-ground fault has occurred, the same as a switching state of phase n.

13. The method according to claim 11, wherein the step of calculating the normal vector includes the step of calculating the normal vector orthogonal to a plane in the three-dimensional voltage vector space formed by the combination of voltage switching vectors.

14. The method according to claim 10, wherein the step of controlling space vector pulse width modulation switching for the transformed coordinates includes the steps of:
setting a reference sector in which a reference vector is located, among sectors generated by dividing a voltage vector area on the two-dimensional SVPWM plane;
calculating duty ratios for expressing the reference vector as effective switching vectors corresponding to the reference sector; and
determining an order of applying voltage vectors on the basis of the duty ratios.

15. The method according to claim 14, wherein the step of the determining an order of applying voltage vectors on the basis of the duty ratios includes the step of the determining an order of applying voltage vectors for the effective switching vectors and zero vectors to be applied, according to the duty ratios during a modulation period for the reference sector.

16. The method according to claim 15, wherein the step of the determining an order of applying voltage vectors on the basis of the duty ratios includes the step of switching the 3-phase 4-leg inverter during a time period according to a plurality of duty ratios for a plurality of effective switching vectors corresponding to the reference sector in which the reference vector is located.

17. The method according to claim 16, wherein the step of the determining an order of applying voltage vectors on the basis of the duty ratios includes the step of switching the 3-phase 4-leg inverter so that the zero vectors may be applied to the 3-phase 4-leg inverter during the duty ratio, which is a remaining time period excluding the plurality of duty ratios from the modulation period.

* * * * *